Oct. 28, 1941.   L. A. SAFFORD   2,260,485
AIR BRAKE
Filed Feb. 24, 1941
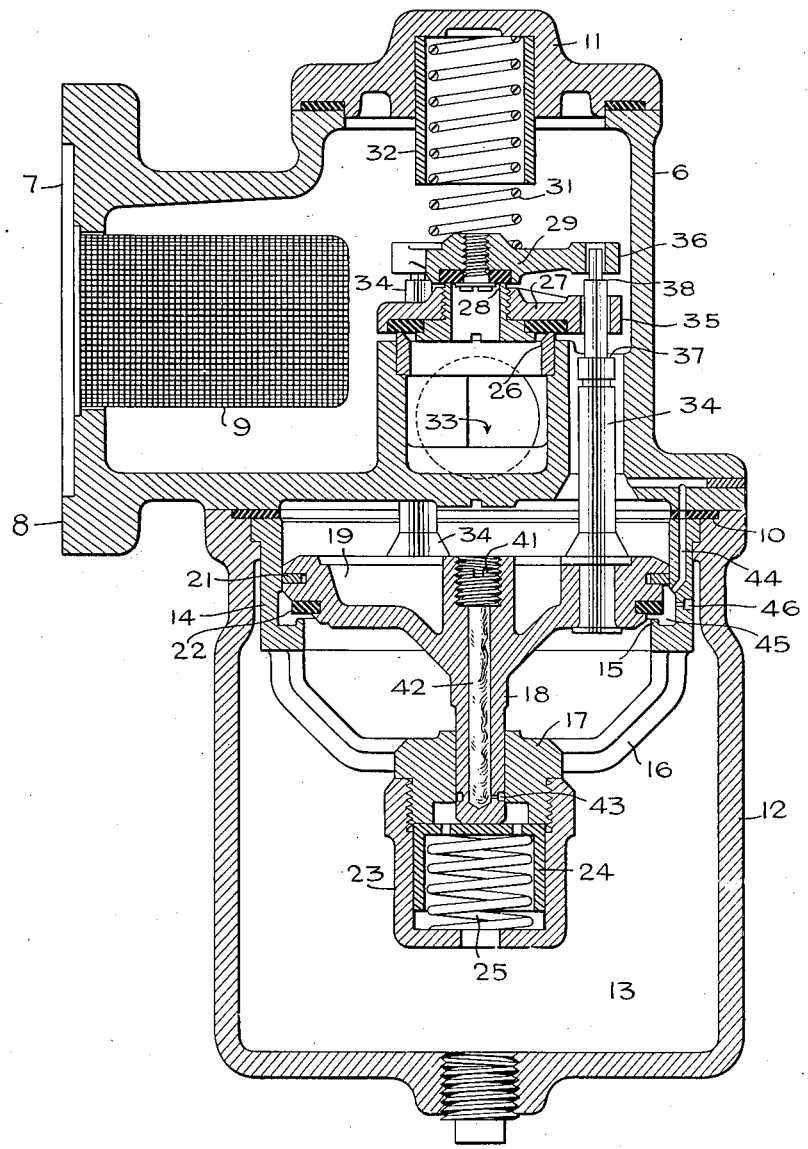
Inventor
Lewis A. Safford
By
Attorneys Patented Oct. 28, 1941

2,260,485

UNITED STATES PATENT OFFICE 2,260,485

AIR BRAKE

Lewis A. Safford, Watertown, N. Y., assignor to The New York Air Brake Company, a corporation of New Jersey Application February 24, 1941, Serial No. 380,345

1 Claim. (Cl. 303—1)

This invention relates to air brakes and particularly to flow controlling chokes and arrangements protecting such chokes from water. This is important because in winter the freezing of water in the choke may seriously derange the valve and cause erratic operation.

The invention is capable of use in many cases where a metering choke is used in conjunction with a by-pass or other flow port, but the invention has particular utility in connection with an emergency vent valve constructed by applicant's assignee under Patent 2,069,914, issued to said assignee upon an invention of Charles A. Campbell on February 9, 1937.

In the Campbell patent aforesaid the piston moves in a vertical direction and has guiding pins which function to unseat the vent valve through which the brake pipe is vented to atmosphere in response to emergency reduction of brake pipe pressure. The piston is interposed between a chamber subject to brake pipe pressure and a small reservoir or quick action chamber. There is a choke port interposed in a port leading directly through the piston and this determines the minimum charging rate from the brake pipe to the quick action chamber. There is also a larger port through the piston, which, when open, affords not only the charging flow from the brake pipe to the quick action chamber, but also affords back flow from the quick action chamber to the brake pipe to prevent response of the piston during service reductions of brake pipe pressure.

This second port is closed by extreme motion of the piston toward the quick action chamber against spring resistance. The effect is to give restricted charging at the head of the train during brake releases and a more rapid breathing rate in both directions between the brake pipe and the quick action chamber at all times.

In the Campbell patent above identified the choke is mounted in the upper face of the piston and hence is quite exposed. The by-pass port is drilled radially through the rim of the piston and is exposed to water reaching the piston, if this accumulates in any considerable quantity.

According to the present invention the general flow control is substantially the same as that disclosed in the Campbell patent but the choke is located in the cylinder bushing at a point below the lowest position reached by the packing ring of the piston so that the choke is always protected by the piston. The flow passage leads from a point above the highest level likely to be reached by water, through a drilled passage partly in the vent valve housing and partly in the bushing, to a clearance groove cut in the inner face of the bushing below the lowest position reached by the packing ring of the piston. In this way both the choke and the flow passage are particularly well protected against the entrance of water.

In the prior Campbell device the choke and the normal charging passage are always in parallel, whereas in the present device flow to the choke is through the by-pass passage. The ultimate effects are the same except that the choke is in a position in which it is safe from water. In the embodiment illustrated the entrance to the charging path is above any water level ever reached in the normal operation of the device, and obviously can be made as high as seems desirable, within the limits imposed by the form of the valve housing.

Except for the location of the charging flow passages, the construction of the vent valve is essentially the same as that shown in the Campbell patent above identified, and accordingly the novel features covered by the present application can be adequately explained by reference to a single view which, in the accompanying drawing, is a vertical axial section through the complete vent valve. It should be understood that the arrangement of the guide pins hereafter mentioned is that illustrated in Fig. 3 of the prior Campbell patent, but since that arrangement is not a feature of the present invention it need not be discussed in detail.

Referring now to the drawing, the body of the vent valve comprises a housing 6 with a brake pipe connection 7 having a bolting flange 8 and a screen 9. A removable cap 11 closes an opening in the top of housing 6. Bolted to housing 6 is a cup-like shell 12 which encloses the balancing chamber 13. Such a balancing chamber is sometimes called in the art a "quick action chamber."

Clamped between the body 6 and shell 12 and sealed by a gasket 10 is the cylinder bushing 14 which is formed at its lower margin with the sealing rim 15 and which carries a pendant yoke 16. The yoke 16 carries the hub 17 which guides the stem 18 of the emergency piston 19. The piston 19 works in the bushing 14 and has a metallic packing ring 21 (sometimes called a snap ring). The piston 19 also carries on its lower face a gasket 22 of rubber-like material. The gasket 22 is arranged to seal on the rim 15 when the piston is in its lowermost position.

A cup 23 is threaded on the lower end of the hub 17 and guides a shiftable stop 24 which is urged upward by a coil compression spring 25. The lower end of the spring 25 is sustained by the cup 23 and the spring urges the stop 24 upward against the lower face of the hub 17. The parts are so dimensioned and arranged that when the stop is in its uppermost position just defined it so positions the lower end of stem 18 and the connected piston 19 that the gasket 22 is spaced slightly above the rim 15. This is the position shown in the drawing. However, if the rise of brake pipe pressure be sufficiently rapid, the piston will be forced down against the resistance of spring 25 until the gasket 22 seals tightly against the rim 15.

In the housing 6 is an upstanding annular valve seat 26 on which the main vent valve 27 seats. The valve 27 has a central port surrounded by a smaller seat 28 and on this a pilot valve 29 seats. A coil compression spring 31, seated within a cup 32, which is carried by the cap 11, reacts downward on the valve 29 and consequently serves to urge both valves closed. An atmospheric port indicated at 33 leads from the space within the seat 26. The piston 19 carries three upstanding guide pins 34, only two of which are visible in the drawing, the third one being forward of the plane of section. They are uniformly spaced around the axis of the piston, the arrangement conforming to that shown in Fig. 3 of the Campbell patent.

The pins 34 pass through wings 35 and 36 which respectively are formed integrally with the valves 27 and 29. The pins are shouldered as indicated at 37 and 38, the spacing being such that when the piston rises from the position shown in the drawing it first moves idly for a short distance, then engages and unseats the valve 29, and on further upward motion facilitated by the opening of the valve 29, unseats the valve 27.

The mechanism so far described will be recognized as conforming to the disclosure of the prior Campbell patent. There is an additional illustrated detail not involved in the present invention comprising a bore in the stem 18 which is closed at its upper end by a plug 41 and which encloses an oil saturated absorbent mass 42. This delivers oil through the ports generally indicated at 43 to the guideway in the hub 17.

Charging flow and back flow to and from the quick action chamber 13 is provided for by means of the passage 44 which comprises communicating drilled passages in body 6 and bushing 14. This leads from the opening in which one pin 34 works, to a groove 45 cut in the inner face of bushing 14 above rim 15 and below the lowest traverse of ring 21. Within groove 45 and leading through bushing 14 is a choke port 46 of limited capacity. This choke port 46 affords slow charging flow through the bushing, when gasket 22 seals on rim 15. All three pins 34 extend upward through passages whose upper ends are well above the bottom of housing 6, so that the passages are well protected against the entrance of water from the brake pipe. Very slight rotary motion of the piston is possible.

*Operation*

In charging the system at normal rates of brake pipe rise the parts assume the position shown in the drawing. Charging flow to the quick action chamber 13 from the brake pipe then takes place through the passage 44, and thence between the gasket 22 and rim 15. At such times the flow through the choke 46 is inconsequential.

If brake pipe pressure rises more rapidly, as it commonly does during brake releases on the leading twenty cars or so of the train, the piston 19 will overpower the spring 25 and the gasket 22 will seal on the rim 15. At such time charging flow is limited to the capacity of the choke 46. The effect is to proect the quick action chamber against overcharge at times when the pressure differential acting downward on piston 19 is excessive. When the differential diminishes, the piston will resume the normal position shown in the drawing and charging will then occur at a more rapid rate, determined by the capacity of passage 44.

During service reductions of brake pipe pressure the piston 19 may rise idly until the shoulders 38 engage the wings 36. However, the flow through passage 44 is adequate to relieve the pressure differential so long as the reduction of brake pipe pressure does not exceed the service rate. If the reduction of brake pipe pressure should occur at emergency rate at any time, the piston will unseat the valve 29 and because of the relief of pressure on the valve 27 and on the upper side of piston 19, which inherently results from the opening of valve 29, the piston will immediately move upward full stroke and so unseat also the valve 27.

The elevated entrance to pasasge 44 and the location of the choke port 46 so that it is always below the piston 21, afford remarkably complete protection to the choke against water which sometimes enters the housing 6 from the brake pipe.

Variations of detail are possible within the spope of the invention. While the entrance to the upper end of passage 44 as shown is high enough for all practical purposes, it obviously can be made even higher by mere change of design.

I claim:

Means for controlling charging and breathing flows between a brake pipe in which functional pressure changes occur at different rates and in reverse directions, and a reservoir charged therefrom, comprising a cylinder having a sealing rim; a piston subject on its opposite sides to brake pipe and reservoir pressures and movable toward said rim by preponderating brake pipe pressure, said piston having its periphery in sealing engagement with said cylinder and having on the reservoir side thereof means for forming with said cylinder rim a second seal which is spaced from said peripheral seal, the cylinder and piston being formed to afford a clearance between said seals; means forming a normal flow path of limited capacity connecting said clearance with the brake pipe, such connection communicating with the brake pipe at a point above the highest level reached by the piston; means forming a flow path of more limited capacity than said normal flow path between said clearance space and the reservoir; and a yielding stop serving, except when its resistance is overcome, to hold said piston spaced from said rim.

LEWIS A. SAFFORD.